United States Patent
Ramalingam et al.

(10) Patent No.: US 10,554,695 B2
(45) Date of Patent: Feb. 4, 2020

(54) NETWORKED DEVICE CONNECTION SYSTEM

(71) Applicant: Dell Products L.P., Round Rock, TX (US)

(72) Inventors: Purushothaman Ramalingam, Chennai (IN); Premnath Sundarababu, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 295 days.

(21) Appl. No.: 14/668,639

(22) Filed: Mar. 25, 2015

(65) Prior Publication Data

US 2016/0285922 A1    Sep. 29, 2016

(51) Int. Cl.
*H04L 29/06* (2006.01)
*G09G 5/00* (2006.01)
(Continued)

(52) U.S. Cl.
CPC ............ *H04L 65/1069* (2013.01); *G06F 3/14* (2013.01); *G09G 5/006* (2013.01);
(Continued)

(58) Field of Classification Search
CPC ..... H04W 76/00; H04W 76/02; H04W 28/18; H04W 12/06; G06F 21/00; G06F 21/30; G06F 21/31; G01N 2035/00881; H04L 41/00; H04L 41/02; H04L 41/08; H04L 41/082; H04L 41/0823; H04L 41/0826; H04L 41/083; H04L 41/0833; H04L 41/0836; H04L 41/084; H04L 41/0843; H04L 41/0846; H04L 41/085;
(Continued)

(56) References Cited

U.S. PATENT DOCUMENTS

| 7,337,227 B1 * | 2/2008 | Hsieh | ........................ G06F 1/18 |
| | | | 379/230 |
| 2004/0219824 A1 * | 11/2004 | Conn | ...................... G06F 1/181 |
| | | | 439/490 |

(Continued)

*Primary Examiner* — Younes Naji
*Assistant Examiner* — Da T Ton
(74) *Attorney, Agent, or Firm* — Haynes and Boone, LLP

(57) ABSTRACT

A networked device connection system includes a network management system, a first networked device including a first networked device connector, and a second networked device including a second networked device connector. The first networked device connects to a network connection member through the first networked device connector and, in response, retrieves a network connection member identifier that it provides, along with a first networked device connector identifier, to the network management system. The network management system uses the network connection member identifier and the first networked device connector identifier to determine that the network connection member should be connected to the second networked device connector and, in response, sends an instruction to the second networked device that activates a second networked device connector indicator that is associated with the second networked device connector prior to connection of the network connection member to the second networked device connector.

17 Claims, 11 Drawing Sheets

(51) Int. Cl.
*H04L 12/24* (2006.01)
*G06F 3/14* (2006.01)
*H04L 29/08* (2006.01)

(52) U.S. Cl.
CPC ...... *H04L 41/0806* (2013.01); *H04L 41/0886* (2013.01); *H04L 41/12* (2013.01); *G09G 2370/025* (2013.01); *G09G 2370/04* (2013.01); *H04L 67/14* (2013.01)

(58) Field of Classification Search
CPC ............. H04L 41/0869; H04L 41/0873; H04L 41/0883; H04L 41/5025; H04L 41/0806; H04L 2025/03656; H04L 7/0004; H04L 67/141; H04L 65/1069; H04L 63/10; H04L 63/08
USPC ................................. 709/220–222, 227–229
See application file for complete search history.

(56) References Cited

U.S. PATENT DOCUMENTS

| | | | | |
|---|---|---|---|---|
| 2006/0277324 | A1* | 12/2006 | Aldereguia | G06F 13/4072 710/1 |
| 2008/0133047 | A1* | 6/2008 | Best | H01R 9/2475 700/215 |
| 2013/0188966 | A1* | 7/2013 | Wu | H04B 10/27 398/139 |
| 2015/0093112 | A1* | 4/2015 | Wu | H04Q 1/136 398/66 |

* cited by examiner

NETWORKED DEVICE CONNECTION SYSTEM

BACKGROUND

The present disclosure relates generally to information handling systems, and more particularly to connection system for networked information handling systems.

As the value and use of information continues to increase, individuals and businesses seek additional ways to process and store information. One option available to users is information handling systems (IHSs). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHSs such as, servers, switches, storage systems, and/or other networked devices known in the art are sometimes connected together in a network such as a data center. The connectivity between those networked devices may be designed using data center topology and capacity planning systems. In such conventional systems, connectivity issues between the networked devices is typically discovered using light emitting devices (LEDs) on the networked devices that are activated after an incorrect connection is made between that networked device and another networked device in the data center. For example, upon a connection to a second networked device (e.g., via a connector on a cable that is already coupled to a first networked device), the second networked device may communicate with the data center topology and capacity planning system about the connection, the data center topology and capacity planning system compares that connection to the connectivity design for the data center. If the connection does not match a connection for the first networked device and second networked device that is included in the connectivity design for the data center (e.g., the first networked device and the second networked device are not connected as detailed in the connectivity design) or an issue with the connection otherwise exists, the data center topology and capacity planning system communicates to the first networked device that a connectivity issue exists, and the first networked device activates the LED to indicate the connectivity issue. The connection of networked devices in a data center in this conventional manner raises a number of issues.

One issue with such conventional systems is that they require that the user have with them the connectivity design for the data center when connecting the networked devices (i.e., to determine how to properly connect the networked devices together as detailed in the connectivity design). Furthermore, the LEDs on the networked devices can only indicate that a connectivity issue exists (e.g., via an activated (e.g., red) LED). As such, when there are multiple possible connectivity issues, a user is required to go back to the data center topology and capacity planning system to determine which of the multiple possible connectivity issues is the actual connectivity issue. As such, connecting data centers in such conventional manners is inconvenient and time consuming for users.

Accordingly, it would be desirable to provide an improved network device connection system.

SUMMARY

According to one embodiment, an information handling system (IHS), includes a processing system; and a memory system that includes instructions that, when executed by the processing system, cause the processing system to provide a connection engine that is configured to: receive, from a first networked device, a network connection member identifier that identifies a network connection member, and a first networked device connector identifier that identifies a first networked device connector on the first networked device to which the networked connection member has been connected; use the network connection member identifier and the first networked device connector identifier to determine that the network connection member should be connected to a second networked device connector on a second network device, wherein the second networked device connector is associated with a second network device connector indicator; and send an instruction to the second networked device to activate the second networked device connector indicator prior to connection of the network connection member to the second networked device connector.

BRIEF DESCRIPTION OF THE DRAWINGS

FIG. 6b is a schematic view illustrating an embodiment of the network connection member of FIG. 4 connected to a first of the networked devices of FIG. 3 in the networked device connection system of FIG. 6a.

FIG. 6c is a schematic view illustrating an embodiment of the first of the networked devices of FIG. 3 indicating a connection issue in the networked device connection system of FIG. 6a.

FIG. 6d is a schematic view illustrating an embodiment of the network connection member of FIG. 4 being brought near a second of the networked devices of FIG. 3 in the networked device connection system of FIG. 6a.

FIG. 6f is a schematic view illustrating an embodiment of the network connection member of FIG. 4 connected to the second of the networked devices of FIG. 3 in the networked device connection system of FIG. 6a.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
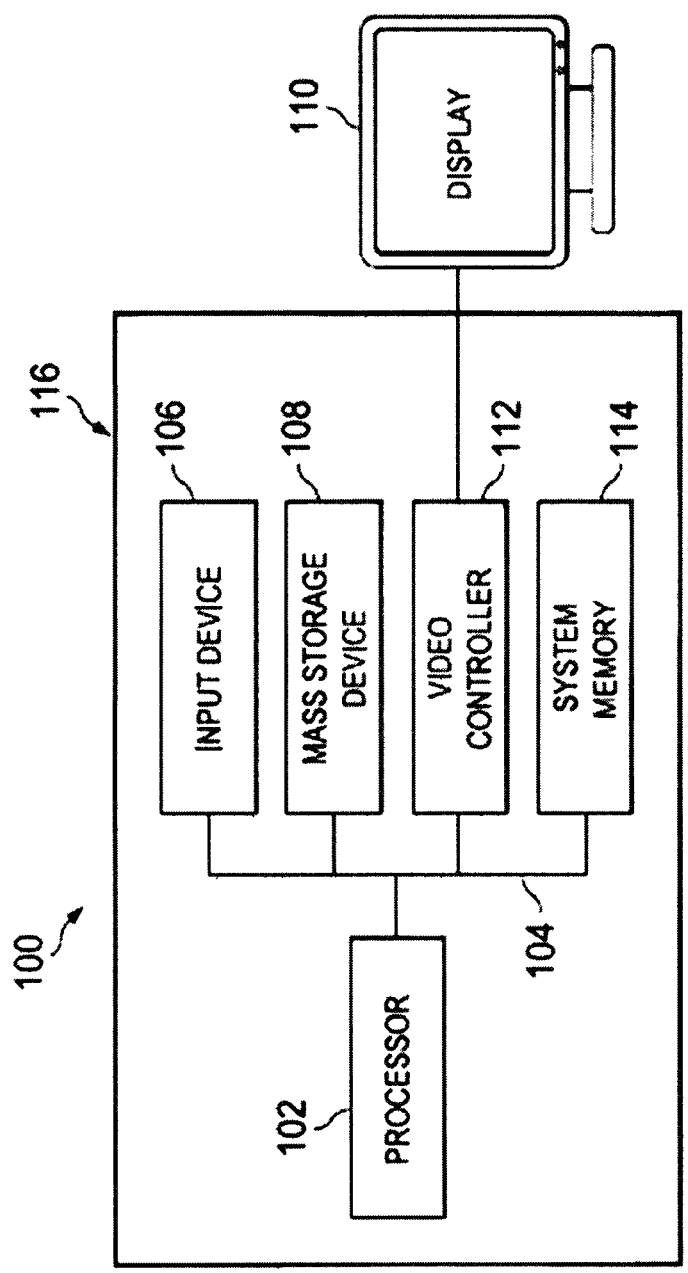
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
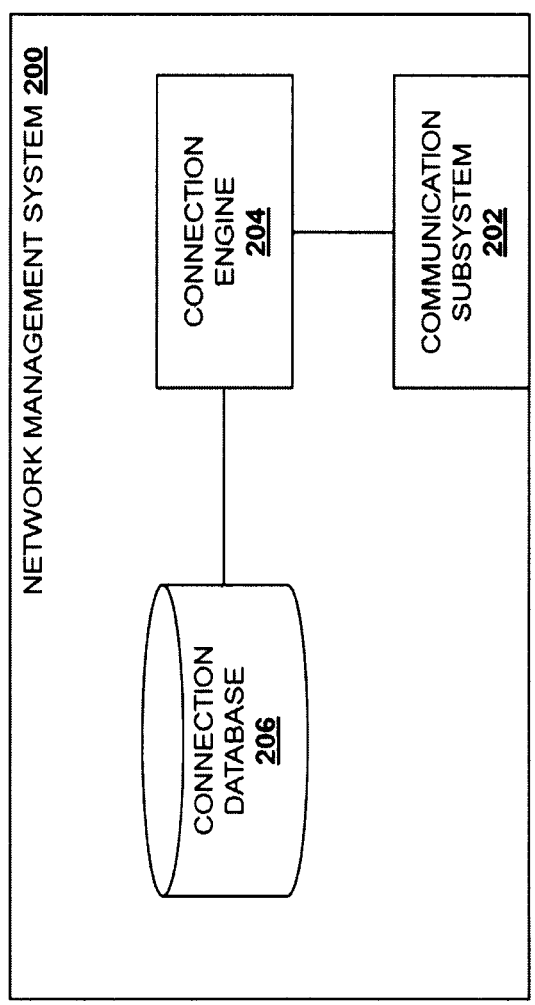
FIG. 2 is a schematic view illustrating an embodiment of a network management system.

Referring now to FIG. 2, an embodiment of a network management system 200 is illustrated. In an embodiment the network management engine 200 may be the IHS 100 discussed above with reference to FIG. 1 and/or may include some or all of the components of the IHS 100. The network management system 200 includes a communication subsystem 202 that is configured to couple to a network or otherwise communicate with networked devices as discussed below. The networked management system 200 includes a processing system (not illustrated, but which may include one or more of the processor 102 discussed above with reference to FIG. 1) and a memory system (not illustrated, but which may include system memory 114 discussed above with reference to FIG. 1) that includes instructions that, when executed by the processing system, cause the processing system to provide a connection engine 204 that operates to perform the functions of the connection engines and network management systems discussed below. The connection engine 204 is coupled to the communication subsystem 202 (e.g., via a connection between the processing system and the communication subsystem 202) and to a connection database 206 that may include one or more storage systems (e.g., the mass storage device 108 and/or system memory 114 discussed above with reference to FIG. 1).

In an embodiment, the networked management system 200 and/or connection engine 204 in the networked management system 200 is/are configured to provide a system that automates the tasks associated with designing, building, and monitoring network fabrics and/or data centers that include a plurality of networked devices. For example, the networked management system 200 and/or connection engine 204 may provide the Active Fabric Manager available from the assignee of the present disclosure, Dell Computers of Round Rock, Tex. In an embodiment, the networked management system 200 and/or connection engine 204 may collect information about the requirements of a network fabric and/or data center, and operate to create a detailed design and wiring plan for the plurality of networked devices in the network fabric and/or data center. Furthermore, the networked management system 200 and/or connection engine 204 may provide for topology design, capacity planning, and/or other network fabric/data center set-up functionality for the network fabric and/or data center. As such, a user may operate the networked management system 200 and/or connection engine 204 to create connectivity data that describes the connections between a plurality of networked devices in a network fabric, data center, or other multi-device interconnected system known in the art. For example, connectivity data may include relative locations of networked devices, desired port-to-port connections on the same or different networked devices, desired transmission rates between networked devices, and/or a variety of other connectivity data known in the art. Such connectivity data may be stored in the connection database 206 and used as discussed below by the connection engine 204.

Figure 3:
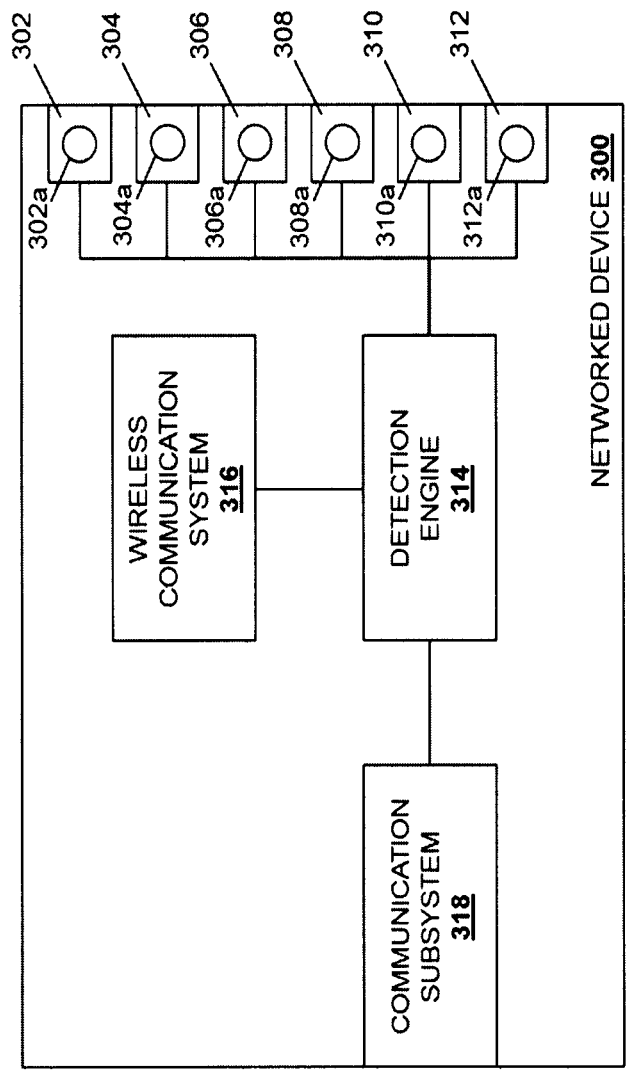
FIG. 3 is a schematic view illustrating an embodiment of a networked device.

Referring now to FIG. 3, an embodiment of a networked device 300 is illustrated. In an embodiment the networked device 300 may be the IHS 100 discussed above with reference to FIG. 1 and/or may include some or all of the components of the IHS 100. For example, the networked device 300 may be a server, a switch, a storage system, a router, an access point, a desktop computer, and/or a variety of other networked devices known in the art. The networked device 300 includes a plurality of networked device connectors 302, 304, 306, 308, 310, and 312. Each of the networked device connectors 302-312 is associated with a respective networked device connector indicator 302a, 304a, 306a, 308a, 310a, and 312a. In the embodiments discussed and illustrated below, the networked device connector indicators 302a-312a are light emitting devices (LEDs). However, the networked device connector indicators 302a-312a may include sound emitting devices, moveable devices, and/or any other device capable of indicating one of the plurality of networked device connectors 302-312 to a user as discussed below.

The networked device 300 includes a processing system (not illustrated, but which may include one or more of the processor 102 discussed above with reference to FIG. 1) and a memory system (not illustrated, but which may include system memory 114 discussed above with reference to FIG. 1) that includes instructions that, when executed by the processing system, cause the processing system to provide a detection engine 314 that operates to perform the functions of the detection engines and networked devices discussed below. The detection engine 314 is coupled to a wireless communication system 316 (e.g., through a connection between the processing system and the wireless communication system 316). In an embodiment, the wireless communication system 316 includes one or more wireless readers that are configured to read wireless tags. In different embodiments, the wireless communication system 316 may be a Near Field Communication (NFC) system, a Bluetooth communication system, an Radio Frequency Identification (RFID) communication system, and/or a variety of other wireless communication systems known in the art. The detection engine 314 is also coupled to a communication subsystem 318 (e.g., through a connection between the processing system and the communication subsystem 318) that is configured to couple to a network or otherwise communicate with networked devices as discussed below. While the method 500 discussed below described the coupling together of two of the networked devices 300 of FIG. 3, in some embodiments, the networked device 300 may be coupled to another networked device that doesn't include all of the features of the networked device 300 of FIG. 3. For example, the networked device 300 may be coupled to a networked device with networked device connections (e.g., similar to the networked device connectors 302-312) that do not include networked device connector indicators (e.g., similar to the networked device connector indicators 302a-312a) while remaining within the scope of the present disclosure.

Figure 4:
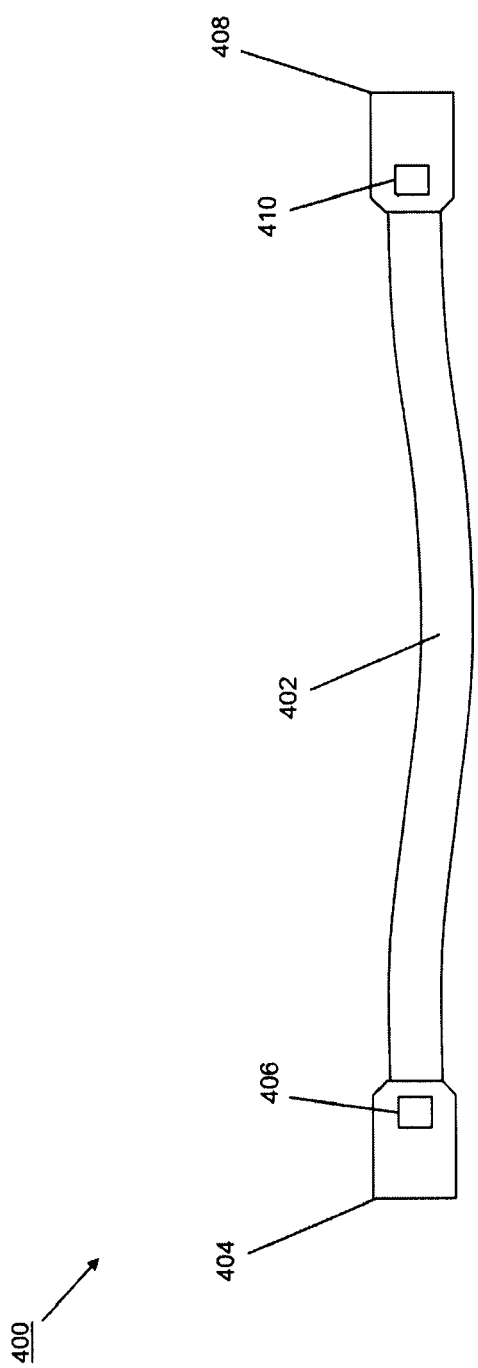
FIG. 4 is a schematic view illustrating an embodiment of a network connection member.

Referring now to FIG. 4, an embodiment of a network connection member 400 is illustrated. In the illustrated embodiment, the network connection member 400 is a cable. However, in other embodiments, the network connection member 400 may be provided by wireless transmitters such as wireless USB dongles, wireless infrared transmitted, and/or other wireless transmitters known in the art while remaining within the scope of the present disclosure. In the illustrated embodiment, the network connection member 400 includes a cable base 402 that may include cabling, shielding, insulation, and/or a variety of other cabling components known in the art. The cabling base 402 may be any length desired, e.g., ranging from relatively short lengths (e.g., 3-5 feet) to relatively long lengths (hundreds of feet), and one of skill in the art will recognize that any length of cabling base 402 is envisioned as falling within the scope of the present disclosure.

The network connection member 400 includes a first connector 404. In the embodiments illustrated and discussed below, the first connector 404 is a modular connector such as an Ethernet connector (e.g., a RJ45 connector). However, the first connector 404 may be any modular connector known in the art, as well as other types of connectors that may include Universal Serial Bus (USB) connectors, High Definition Multimedia Interface (HDMI) connectors, DisplayPort connectors, Video Graphics Array (VGA) connectors, audio connectors, digital optic connectors, Digital Visual Interface (DVI) connectors, RCA connectors, Firewire connectors, eSATA connectors, phone connectors (e.g., RJ11), and/or a variety of other connectors known in the art. In the illustrated embodiment, a first wireless communication system 406 is included in the first connector 404. However, the first wireless communication system 406 may be included in the cabling base 402 (e.g., adjacent the first connector 404, spaced apart from the first connector 404, etc.) while remaining within the scope of the present disclosure. In an embodiment, the first wireless communication system 406 includes a wireless tag that is configured to communicate with a wireless reader. In different embodiments, the first wireless communication system 406 may be a Near Field Communication (NFC) system, a Bluetooth communication system, a Radio Frequency Identification (RFID) communication system, and/or a variety of other wireless communication systems known in the art. In different embodiments, the first wireless communication system 406 may store a variety of information about the network connection member 400 such as, for example, a global identifier that is unique to the network connection member 400, an identifier that is unique to the first connector 404, information about the network connection member 400 (e.g., the length of the cabling base 402, the type of the network connection member 400, the transmission capabilities of the network connection member 400, and/or any other network connection member information known in the art), and/or a variety of other information known in the art.

The network connection member 400 also includes a second connector 408 that is located opposite the cabling base 402 from the first connector 404. In the embodiments illustrated and discussed below, the second connector 408 is a modular connector such as an Ethernet connector (e.g., a RJ45 connector). However, second connector 408 may be any modular connector known in the art, as well as other types of connectors that may include Universal Serial Bus (USB) connectors, High Definition Multimedia Interface (HDMI) connectors, DisplayPort connectors, Video Graphics Array (VGA) connectors, audio connectors, digital optic connectors, Digital Visual Interface (DVI) connectors, RCA connectors, Firewire connectors, eSATA connectors, phone connectors (e.g., RJ11), and/or a variety of other connectors known in the art. In the illustrated embodiment, a second wireless communication system 410 is included in the second connector 408. However, the second wireless communication system 410 may be included in the cabling base 402 (e.g., adjacent the second connector 408, spaced apart from the second connector 408, etc.) while remaining within the scope of the present disclosure. In an embodiment, the second wireless communication system 410 includes a wireless tag that is configured to communicate with a wireless reader. In different embodiments, the second wireless communication system 410 may be a Near Field Communication (NFC) system, a Bluetooth communication system, a Radio Frequency Identification (RFID) communication system, and/or a variety of other wireless communication systems known in the art. In different embodiments, the second wireless communication system 410 may store a variety of information about the network connection member 400 such as, for example, a global identifier that is unique to the network connection member 400 (i.e., the same global identifier that is stored in the first wireless communication system 406), an identifier that is unique to the second connector 408, information about the network connection member 400 (e.g., the length of the cabling base 402, the type of the network connection member 400, the transmission capabilities of the network connection member 400, and/or any other network connection member information known in the art), and/or a variety of other information known in the art.

Figure 5:
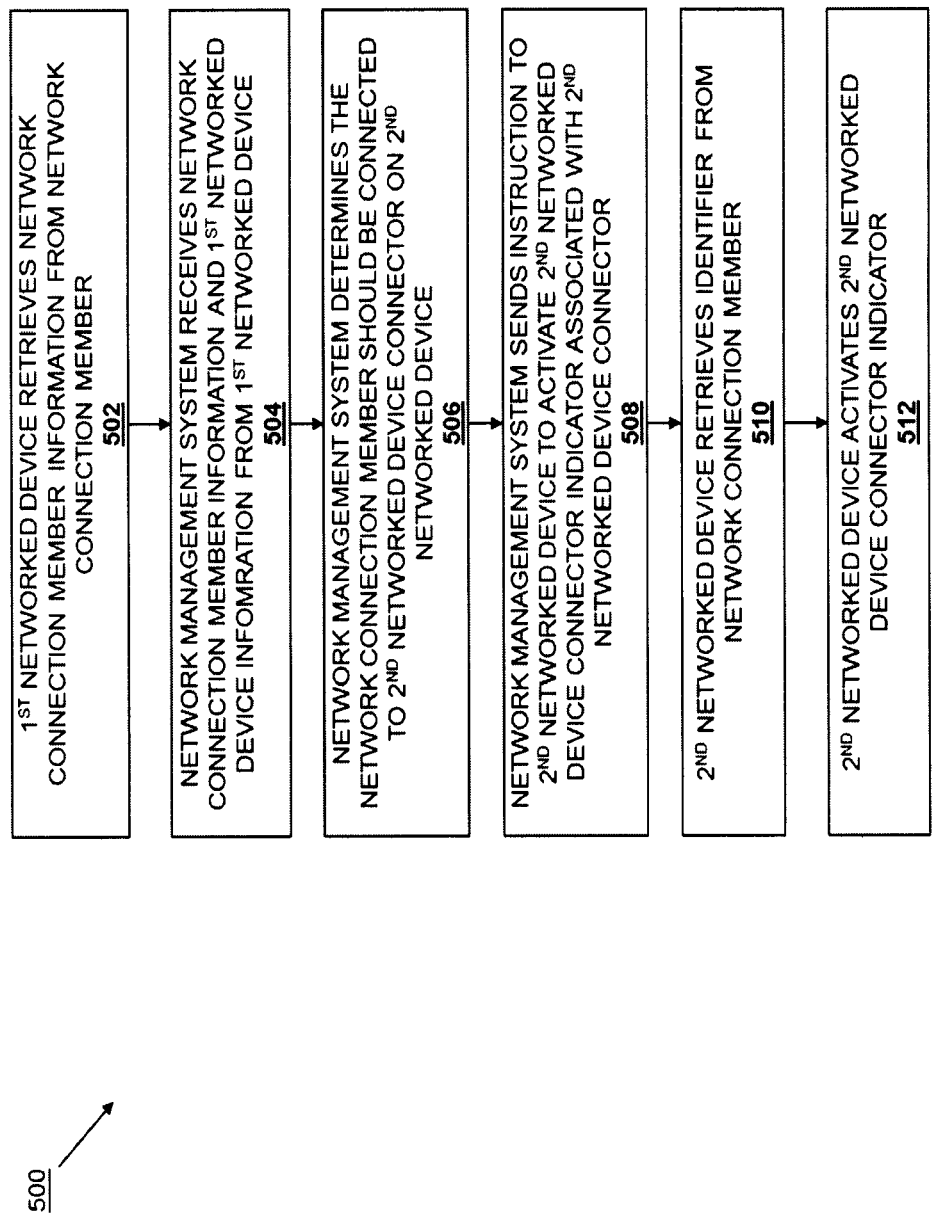
FIG. 5 is a flow chart illustrating an embodiment of a method for connecting networked devices.
Figure 6A:
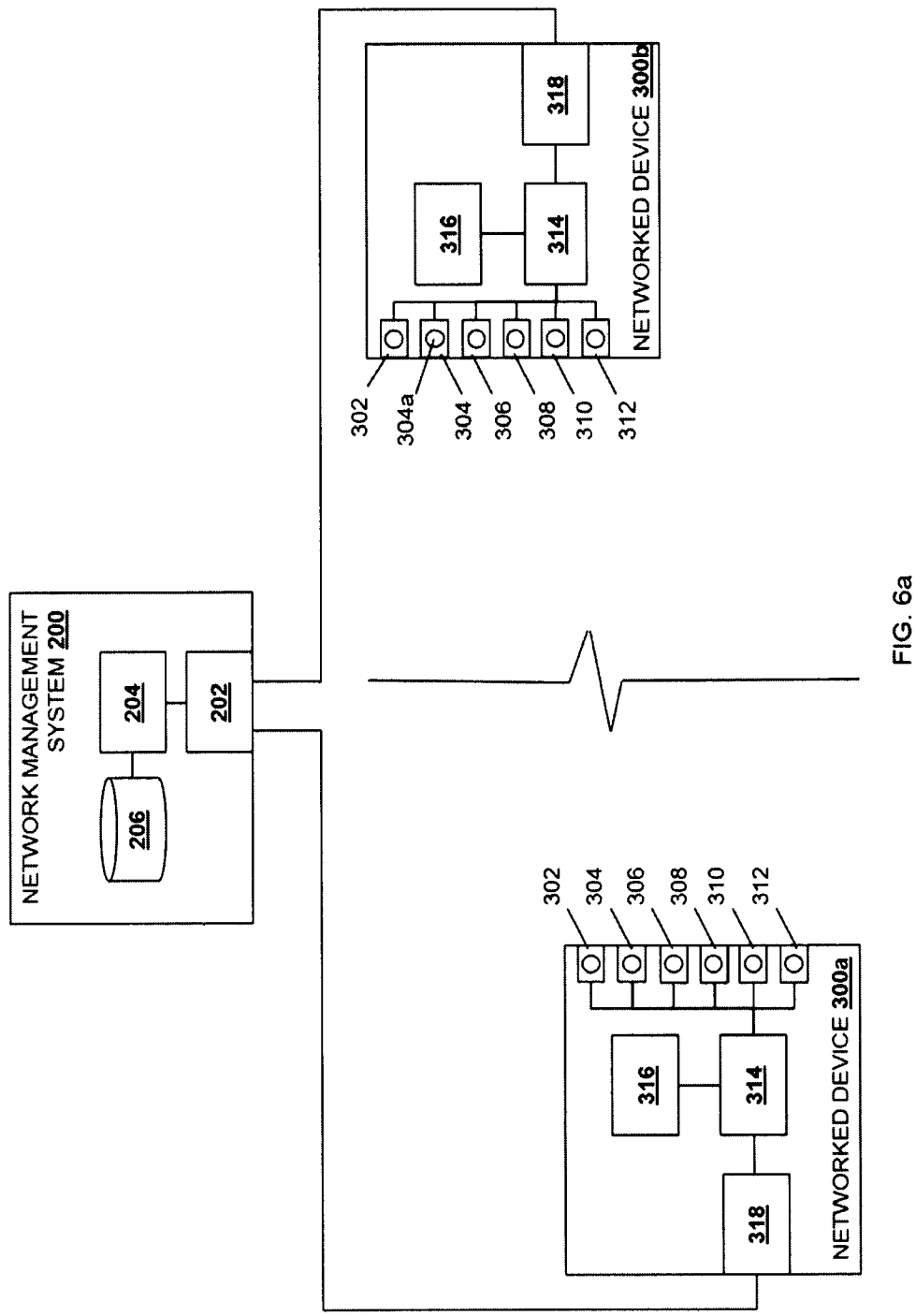
FIG. 6a is a schematic view illustrating an embodiment of a networked device connection system.

Referring now to FIG. 5, an embodiment of a method 500 for connecting networked devices is illustrated. As discussed in further detail below, in one embodiment the method 500 utilizes connectivity data that describes the connections between a plurality of networked devices (e.g., a data center topology, wiring plan, design information, and/or other connectivity data known in the art etc.) to indicate to a user the correct connector on a second networked device to which a cable should be connected when that cable is already connected to a first networked device, and that indication is provided prior the connection of the cable to the second networked device. In one embodiment, prior to the method 500, the network management system 200 is coupled to a plurality of networked devices such as the networked devices 300a and 300b illustrated in FIG. 6a (e.g., element 300a indicating a first networked device that is substantially similar to the networked device 300, and element 300b indicating a second networked device that is substantially similar to the networked device 300). For example, the communication subsystem 202 on the network management system 200 may be coupled to the communication subsystems 318 on each of the networked devices 300a and 300b using methods known in the art (e.g., via network cables, wireless communication, etc.) While two identical networked devices substantially similar to the networked device 300 are illustrated and described as being connected to the network management system 200 for clarity of illustration and discussion, any number of different networked devices with different features may be coupled to the network management system 200 and operate according to the method 500 as discussed below.

Figure 6B:
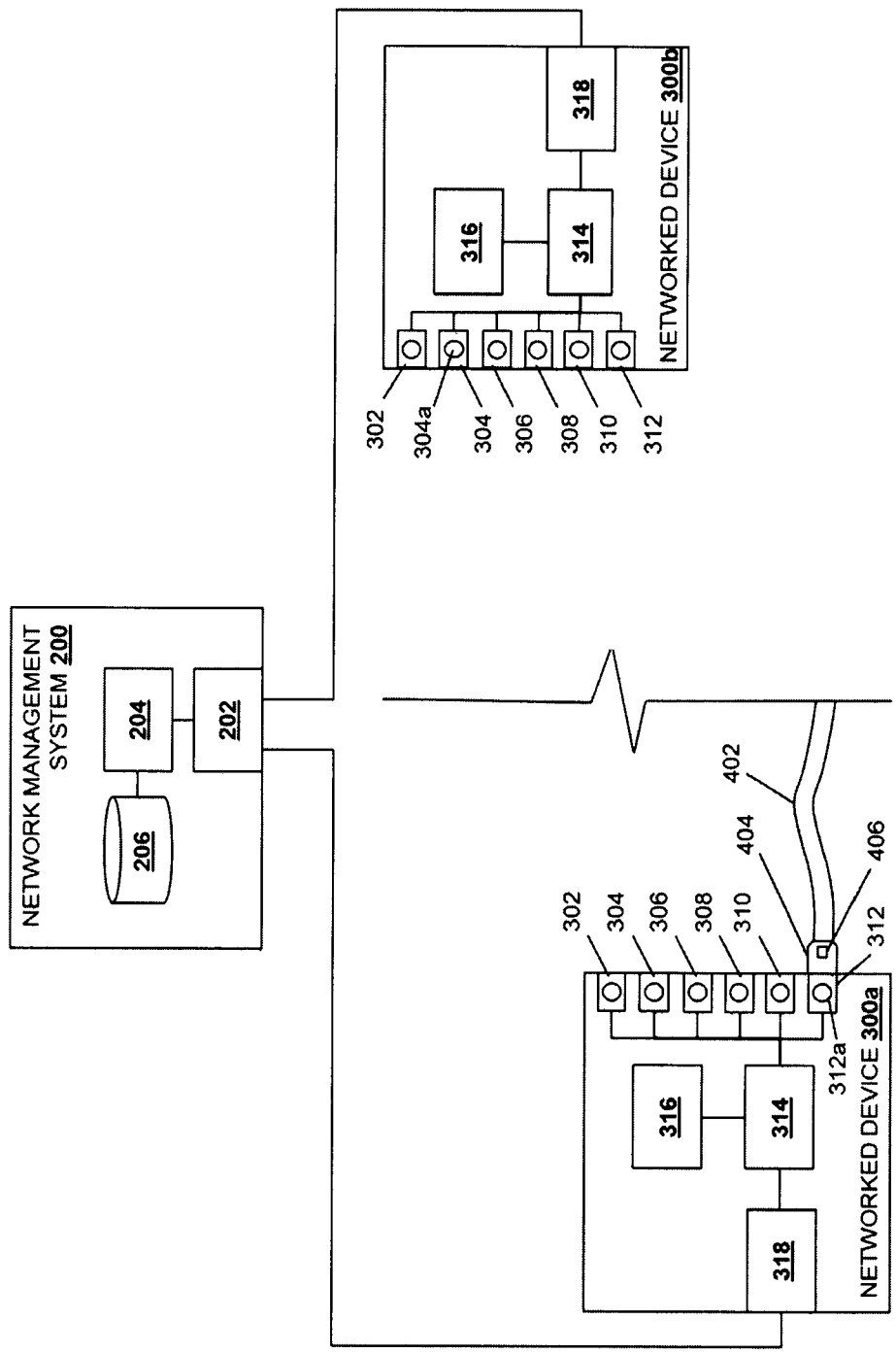

The method 500 begins at block 502 where a first networked device retrieves network connection member information from a network connection member. Referring now to FIG. 6b, the first connector 404 on the network connection member 400 is connected to the networked device connector 312 on the networked device 300a. The detection engine 314 in the networked device 300a detects the connection of the first connector 404 on the network connection member 400 to the networked device connector 312 on the networked device 300a, and determines an identifier for the networked device connector 312 on the networked device 300a (a "networked device connector identifier" for the networked device connector 312, which may include a port number, an address, and/or a variety of other identifiers known in the art). In addition, the wireless communication system 316 in the networked device 300a may communicate with the wireless communication system 406 in the first connector 404 on the network connection member 400 before the connection of the first connector 404 on the network connection member 400 to the networked device connector 312 on the networked device 300a, upon the connection of the first connector 404 on the network connection member 400 to the networked device connector 312 on the networked device 300a, or after the connection of the first connector 404 on the network connection member 400 to the networked device connector 312 on the networked device 300a.

The communication between the wireless communication system 316 in the networked device 300a and the wireless communication system 406 in the first connector 404 on the network connection member 400 includes an exchange of an identifier for the network connection member 400 that may include a global identifier that is unique to the network connection member 400. In addition, the communication between the wireless communication system 316 in the networked device 300a and the wireless communication system 406 in the first connector 404 on the network connection member 400 may exchange any other information stored in or accessible to the wireless communication system 406 such as, for example, an identifier that is unique to the first connector 404, information about the network connection member 400 (e.g., the length of the cabling base 402, the type of the network connection member 400, the transmission capabilities of the network connection member 400, and/or any other network connection member information known in the art), and/or a variety of other information known in the art.

While the information retrieved by the networked device 300a from the network connection member 400 is illustrated and described as being retrieved via wireless communications between the wireless communication system 316 in the networked device 300a and the wireless communication system 406 in the network connection member 400, that information may be communicated in other manners. For example, subsequent to the connection of the first connector 404 on the network connection member 400 to the networked device connector 312 on the networked device 300a, that connection may be used to retrieve the network connection member information (e.g., by the detection engine 314 in the networked device 300a from a storage in the network connection member 400). In an embodiment, upon retrieving the network connection member identifier and/or other network connection member information, the detection engine 314 may associate the network connection member identifier/information with the networked device connector for which the most recent connection was detection (e.g., the networked device connector 312 to which the network connection member 400 was connected, as illustrated in FIG. 6b).

The method 500 then proceeds to block 504 where the network management system receives network connection member information and first networked device information from the first networked device. In an embodiment, at block 504 the detection engine 314 in the networked device 300a retrieves the network connection member information from wireless communication system 316 in the networked device 300a, and sends the network connection member information, along with information about the networked device 300a, to the network management system 200 through the communication subsystem 318. For example, detection engine 314 in the networked device 300a may retrieve and send the global identifier for the network connection member 400, along with the networked device connector identifier that was determined for the networked device connector 312 (to which the network connection member 400 was connected), to the network management system 200 through the communication subsystem 318.

Furthermore, the detection engine 314 in the networked device 300a may determine and send an identifier for the networked device 300a such as, for example, a Media Access Control (MAC) address, and Internet Protocol (IP) address, and/or a variety of other networked device identifiers to the network management system 200 through the communication subsystem 318. Further still, the detection engine 314 in the networked device 300a may send the identifier that is unique to the first connector 404, information about the network connection member 400 (e.g., the length of the cabling base 402, the type of the network connection member 400, the transmission capabilities of the network connection member 400, and/or any other network connection member information known in the art), and/or any other information retrieved from the network connection member 400 to the network management system 200 through the communication subsystem 318. At block 504, the connection engine 204 in the network management system 200 receives the network connection member information and the first networked device information through the communication subsystem 202 from the networked device 300*a*.

The method 500 then proceeds to block 506 where the network management system determines that the network connection member should be connected to a second networked device connector on a second networked device. In an embodiment, at block 506 the connection engine 204 accesses the connectivity data in the connection database 206, and uses the network connection member information and the first networked device information to determine that the network connection member 400 should be connected to the networked device connector 304 on the networked device 300*b*. For example, using the global identifier for the network connection member 400 and the networked device connector identifier for the networked device connector 312, the connection engine 204 may reference the connectivity data and determine that a network connection member 400 that is connected to the networked device connector 312 on the networked device 300*a* should also be connected to the networked device connector 304 on the networked device 300*b*. In a specific embodiment, the connection engine 204 may reference a database wiring plan and determine that a cable connected to a first port on a particular server should be connected to a second port on a particular switch. As such, the connection member may use the networked device identifier (e.g., a MAC address of the networked device 300*a*), the networked device connector identifier (e.g., a port number of the networked device 300*a*), and a network connection member identifier (e.g., the global identifier for the cable) along with the connectivity data to determine the proper connection for a cable to a second networked device. As such, at block 506 the connection engine 204 may determine the identity of the networked device 300*b* (e.g., identified by a MAC address, an IP address, and/or other identifiers known in the art), as well as an identifier for the networked device connector 304 (a "networked device connector identifier" for the networked device connector 304).

Figure 6C:
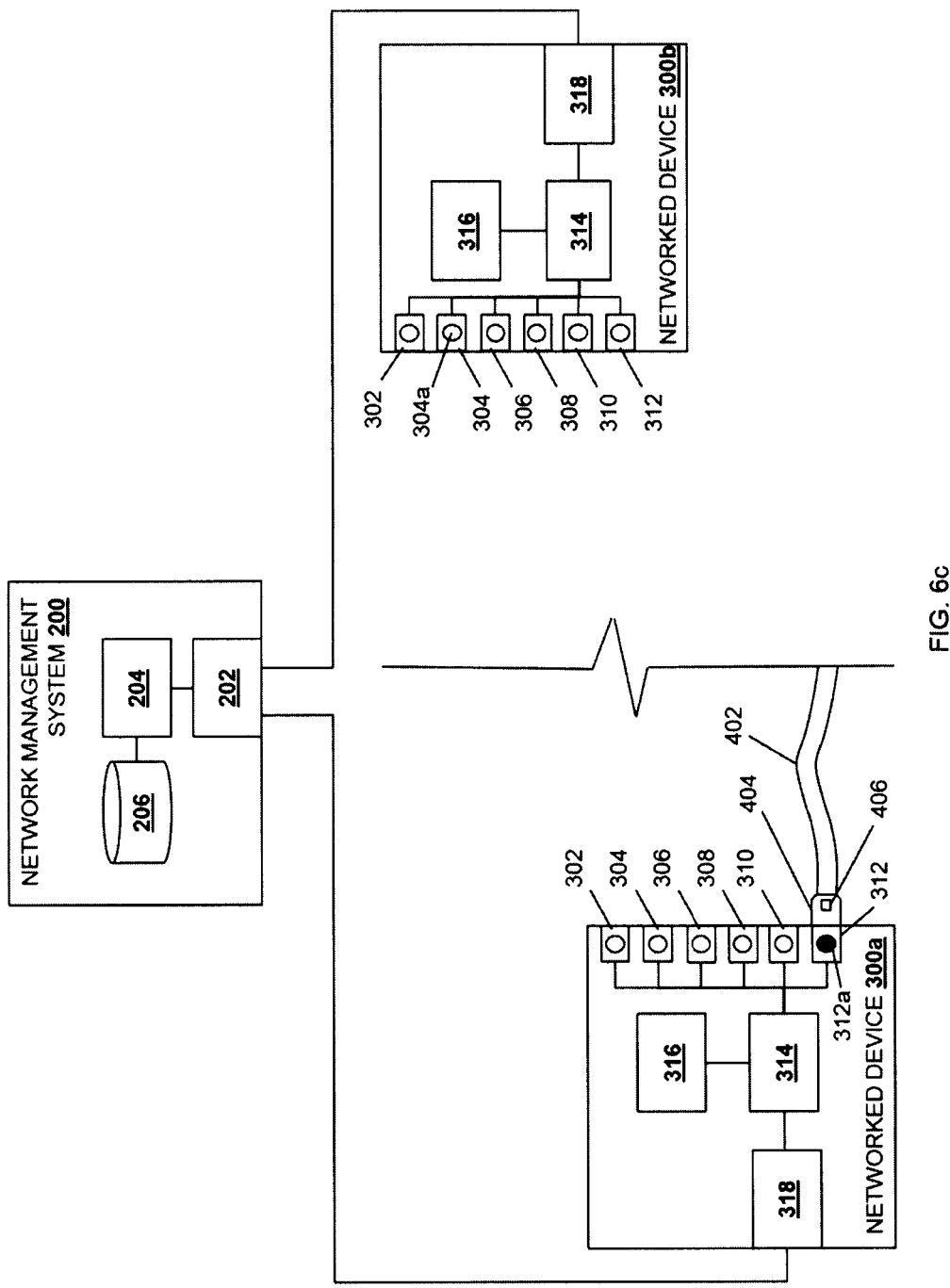

The connection engine 204 may also use the information received at block 504 to provide the user with a variety of different information. In an embodiment, information about the network connection member 400 may be used to communicate possible connection issues to the user. For example, the information received at block 504 may include the length of the cabling base 402, and the connectivity data in the connection database 206 may indicate that the networked device 300*b* is approximately 200 feet from the networked device 300*a*. Using the example above where the connection engine 204 determines that network connection member 400 connected to the networked device connector 312 on the networked device 300*a* should also be connected to the networked device connector 304 on the networked device 300*b*, if the connection engine 204 determines that the cabling base 402 on the network connection member 400 is less than 200 feet in length, the connection engine 204 may send an instruction through the communication subsystem 202 to the networked device 300*a* to activate the networked device connector indicator 312*a*. The detection engine 314 will then receive the instruction from the connection engine 204 in the network management device 200 through the communication subsystem 318 and, in response, activate the networked device connector indicator 312*a*, as illustrated in FIG. 6*c*. As discussed above, while the activation of the networked device connector indicator 312*a* is illustrated as an illuminated LED, an audible sound, movement, or other indicator will fall within the scope of the present disclosure. The user will then be alerted of the connectivity issue (i.e., the network connection member 400 is not of a sufficient length to make the connection). In an embodiment, the activation of the networked device connector indicator (and the associated instruction) may be configured to provide specific information such as "cable too short" by activating in a predetermined color, blinking at a predetermined rate, etc. The user may then replace the network connection member 400 with a network connection member with a sufficient length.

In another example, the information received at block 504 may include the transmission capabilities of the network connection member 400, and the connectivity data in the connection database 206 may indicate that the connection between the networked device 300*b* and the networked device 300*a* should include a minimum transmission speed. Using the example above where the connection engine 204 determines that network connection member 400 connected to the networked device connector 312 on the networked device 300*a* should also be connected to the networked device connector 304 on the networked device 300*b*, if the connection engine 204 determines that the network connection member 400 will provide less than the minimum transmission speed, the connection engine 204 may send an instruction through the communication subsystem 202 to the networked device 300*a* to activate the networked device connector indicator 312*a*. The detection engine 314 will then receive the instruction from the connection engine 204 in the network management device 200 through the communication subsystem 318 and, in response, activate the networked device connector indicator 312*a*, as illustrated in FIG. 6*c*. As discussed above, while the activation of the networked device connector indicator 312*a* is illustrated as an illuminated LED, an audible sound, movement, or other indicator will fall within the scope of the present disclosure. The user will then be alerted of the connectivity issue (i.e., the network connection member 400 does not have sufficient transmission capabilities to support the minimum transmission speed). In an embodiment, the activation of the networked device connector indicator (and the associated instruction) may be configured to provide specific information such as "transmission capabilities deficient" by activating in a predetermined color, blinking at a predetermined rate, etc. The user may then replace the network connection member 400 with a network connection member with a sufficient transmission capability.

While a few examples have been provided, one of skill in the art will recognize how a variety of network connection member information may be utilized with a data center design plan to determine possible connection issues and warn a user even when the network connection member has only been connected to a single networked device. For example, knowledge of the distance between networked devices that are to be connected may allow for the connection engine 204 to determine whether network connection members are being used efficiently. For example, if a 150 foot cable is connected to a first networked device and it is determined that the second networked device is within 50 feet, the connection engine 204 may send an instruction to the first networked device to indicate to the user that a shorter cable should be used. Such functionality may be enabled by rules that warn a user when a cable is a percentage longer (e.g., 35% longer than needed) than necessary to make a connection, and indications may include activation of an LED in a red color for excessively long cables (e.g., 50% longer than needed), activation of the LED in a yellow color for cables that are longer than desired (e.g., approximately 35% longer than needed), and activation of the LED in a green color for cables being used efficiently (e.g., approximately 15% longer than needed). While specific examples have been provided, one of skill in the art will recognize how the use of cables may be optimized by warning the user about a variety of connection issues in this manner prior to connecting the cables to both networked devices.

The method 500 then proceeds to block 508 where the network management system sends an instruction to the second networked device to activate the second networked device connector indicator associated with the second networked device connector. In an embodiment, the connection engine 204 creates and sends an instruction to activate the networked device connector indicator 304a associated with the second networked device connector 304 through the communication subsystem 202 to the networked device 300b (e.g., via its MAC address, IP address, and/or other identifier). In an embodiment, the instruction is included with the network connection member identifier for the network connection member 400 and the networked device connector identifier for the networked device connector 304 on the networked device 300b. In an embodiment, the detection engine 314 in the networked device 314 receives the instruction, the network connection member identifier for the network connection member 400, and the networked device connector identifier for the networked device connector 304, and stores a connection association between of the network connection member identifier for the network connection member 400 and the networked device connector identifier for the networked device connector 304. As such, the detection engine 314 in the networked device 300b may store a plurality of connection associations for a variety of different network connection members that have been connected to a variety of different networked devices. As discussed below, in some embodiments, the instruction to activate the second networked device connector indicator that is received by the second networked device is not executed immediately (i.e., by activating an LED upon receiving the instruction), but rather is stored as part of the connection association between the network connection member identifier and the second networked device connector indicator such that it may be executed upon detection of the network connection member adjacent the second networked device. However, in some embodiments, the instruction to activate the second networked device connector indicator that is received by the second networked device may be executed upon receiving the instruction.

Figure 6D:
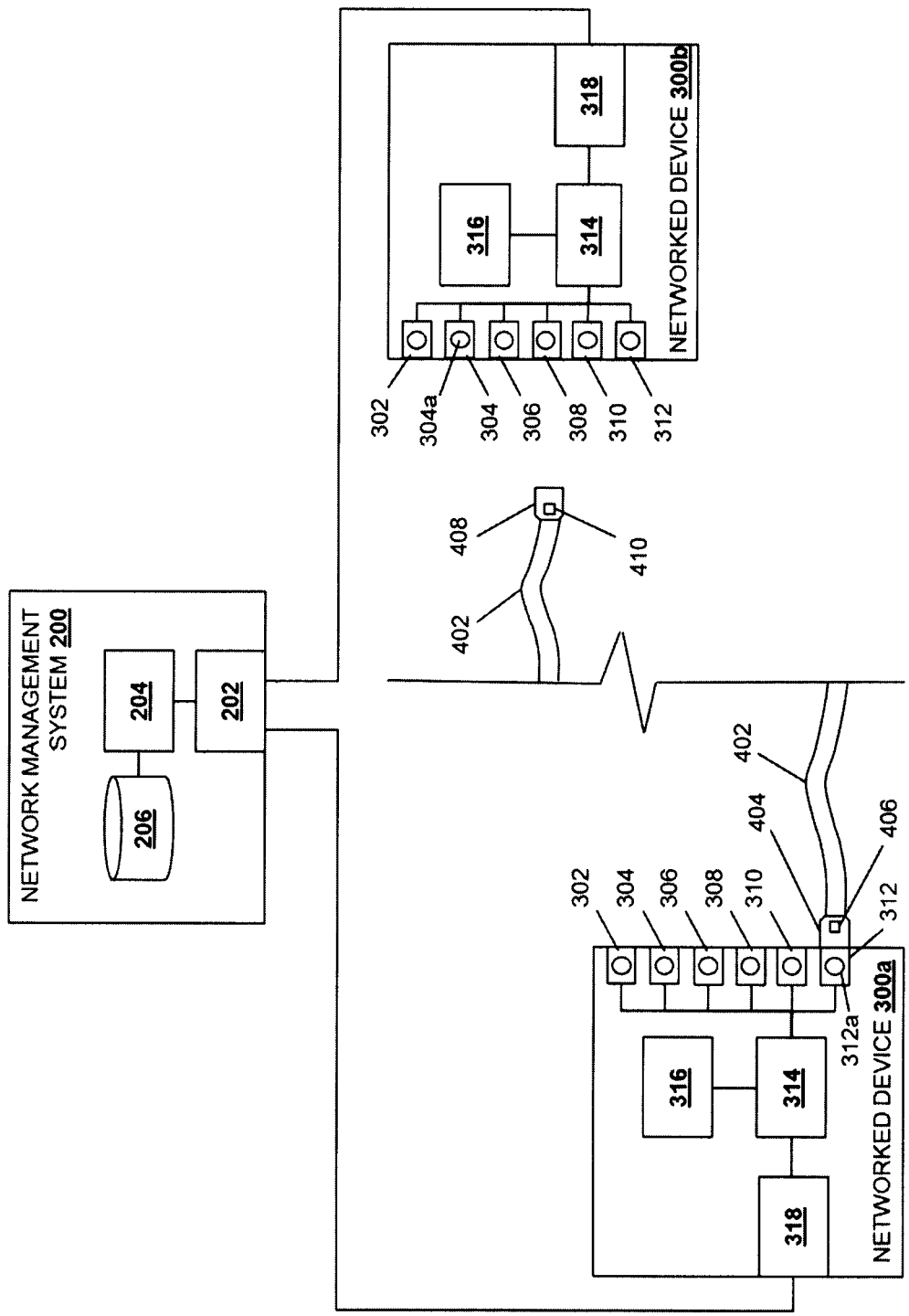

The method 500 then proceeds to block 510 where the second networked device retrieves an identifier from the network connection member. Referring now to FIG. 6d, the user may move the second connector 408 on the network connection member 400 (which is connected to the networked device 300a via the first connector 404 and the networked device connector 312 on the networked device 300a) towards the networked device 300b. When the wireless communication system 410 in the network connection member 400 moves within communication range of the wireless communication system 316 in the networked device 300b, the wireless communication system 316 in the networked device 300b will communicate with the wireless communication system 410 in the network connection member 400 to retrieve the network connection member identifier for the networked connection member 400.

Figure 6E:
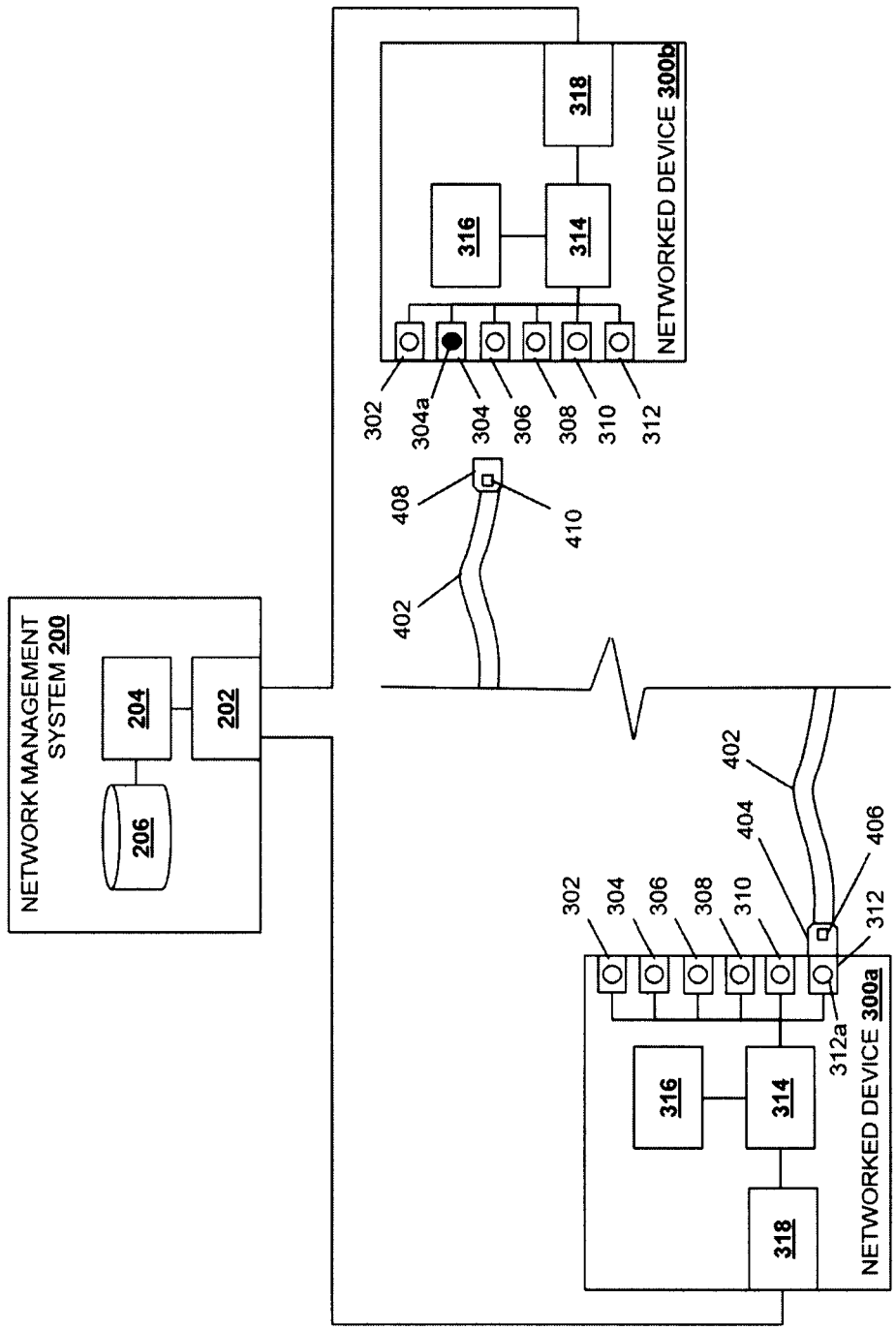
FIG. 6e is a schematic view illustrating an embodiment of the second of the networked devices of FIG. 3 detecting the network connection member of FIG. 4 in the networked device connection system of FIG. 6a and providing an indication of a second networked device connector to which the network connection member should be connected.
Figure 6F:
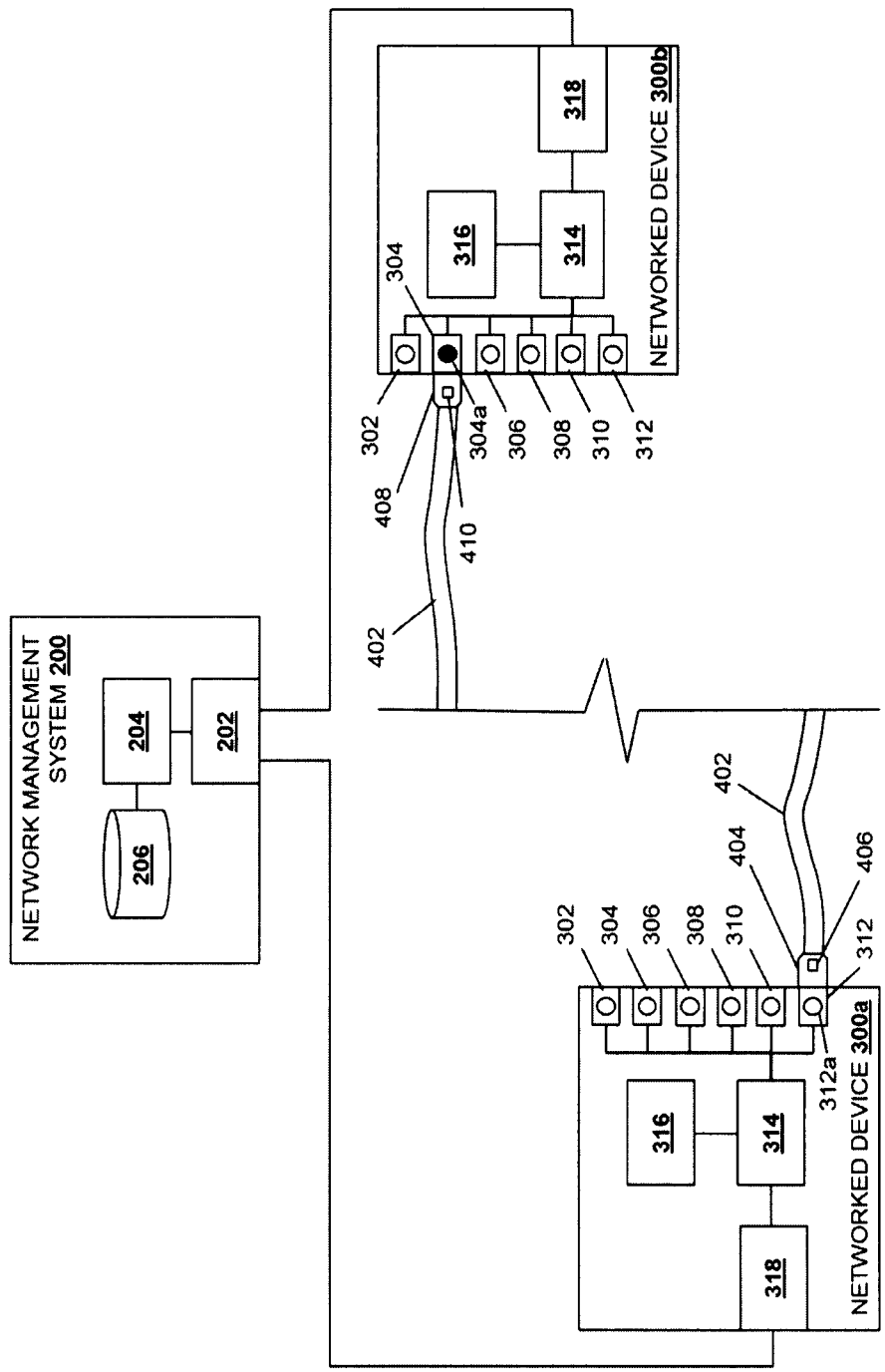

The method 500 then proceeds to block 512 where the second networked device activates the second networked device connector indicator. Referring now to FIG. 6e, the detection engine 314 in the networked device 300b may operate at block 512 to retrieve the network connection member identifier retrieved by the wireless communication system 316 in the networked device 300b at block 510, and compare that network connection member identifier to any of a plurality of connection associations that have been previously stored by the detection engine 314 in the networked device 300b. Upon determining that the network connection member identifier retrieved at block 510 corresponds to the network connection member identifier that is included in the connection association with the networked device connector identifier for the networked device connector 304, the detection engine 314 operates to execute the related instruction that was received from the network management device 200 to activate the networked device connector indicator 304a that is associated with the networked device connector 304, as illustrated in FIG. 6e. As discussed above, while the activation of the networked device connector indicator 304a is illustrated as an illuminated LED, an audible sound, movement, or other indicator will fall within the scope of the present disclosure. As illustrated in FIGS. 6e and 6f, the activation of the networked device connector indicator 304a indicates to the user that the second connector 408 should be connected to the networked device connector 304 on the networked device 300b, and the user may then connect the second connector 408 to the networked device connector 304 on the networked device 300b, as illustrated in FIG. 6f.

In response to determining that the network connection member 400 has been connected to both the networked device 300a and the networked device 300b (e.g., via communication between the connection engine 204 in the network management device 200 and the detection engines 314 in each of the networked devices 300a and 300b), as illustrated in FIG. 6f, the connection engine 204 may store a connection mapping for the networked devices 300a and 300b in the connection database 206. The connection mapping may include any details about the connection including the networked device identifiers for the networked devices 300a and 300b, the networked device connector identifiers for the networked device connectors 312 and 304, the network connection member identifier for the network connection member 400, any of the other information discussed above, and/or other connection information known in the art. In the event either of the first connector 404 or the second connector 408 is removed from the networked device connectors 312 or 304, respectively, on the networked devices 300a or 300b, respectively, the connection engine 204 may operate to remove the connection mapping for the networked devices 300a and 300b.

Thus, systems and methods have been described that provide for the detection of a connection of a connection member to a first device, and the automatic determination of the correct connection for the connection member to a second device. That determination is communicated to the second device, and when the connection member is brought adjacent the second device, an indication is provided as to where on the second device the connection member should be connected. As such, a user may connect a first end of a cable to a port on a server, take a second end of the cable to a switch, and the LED for the port on the switch that the second end of the cable should be connected to will be activated so that the user knows to connect the second end of the cable to that port. As such, the connection of networked devices is simplified, the need for a user to carry with them a connectivity diagram to connect networked devices is eliminated, and errors in connecting devices are greatly reduced.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked device connection system, comprising:
   a network management system;
   a first networked device that is coupled to the network management system and that includes a first networked device connector, wherein the first networked device is configured to:
   connect to a network connection member through the first networked device connector and, in response to the network connection member connecting to the first networked device through the first networked device connector, retrieve a network connection member identifier from the network connection member that is unique to the network connection member; and
   provide the network connection member identifier and a first networked device connector identifier to the network management system; and
   a second networked device that is coupled to the network management system and that includes a plurality of second networked device connectors that are the same type of network device connectors and that are each associated with a respective second networked device connector indicator, wherein the network management system is configured to:
   use the network connection member identifier and the first networked device connector identifier to determine that the network connection member should be connected to a first of the plurality of second networked device connectors and, in response and subsequent to connecting the network connection member to the first networked device through the first networked device connector, send an instruction that includes a second networked device connector identifier that identifies the first of the plurality of second networked device connectors to the second networked device,
   wherein the second networked device is configured to:
   receive the instruction from the network management system;
   retrieve the network connection member identifier from the network connection member via a communication between a wireless reader in the second networked device and a wireless transmitter in the network connection member; and
   activate, prior to connection of the network connection member to the first of the plurality of second networked device connectors and based on the network connection member identifier being both retrieved from the network connection member and included in the instruction received from the network management system, the respective second networked device connector indicator for the first of the plurality of second networked device connectors identified in the instruction.

2. The system of claim 1, wherein, in response to the connection of the network connection member to the first networked device through the first networked device connector, the first networked device is configured to provide a first networked device identifier to the network management system, and wherein the network management system is configured to use the network connection member identifier, the first networked device connector identifier, and the first networked device identifier to determine that the network connection member should be connected to the first of the plurality of second networked device connectors.

3. The system of claim 1, wherein the network management system stores connectivity data describing connections between a plurality of networked devices that include the first networked device and the second networked device, and wherein the network management system determines that the network connection member should be connected to the first of the plurality of second networked device connectors by comparing the network connection member identifier and the first networked device connector identifier to the connectivity data.

4. The system of claim 1, wherein the network management system is configured to send the network connection member identifier to the second networked device along with the instruction.

5. The system of claim 4, wherein the second networked device is configured to store a connection association of the network connection member identifier and the second networked device connector identifier.

6. An information handling system (IHS), comprising:
   a processing system; and
   a memory system that includes instructions that, when executed by the processing system, cause the processing system to provide a connection engine that is configured to:
   receive, from a first networked device, a network connection member identifier that is unique to a network connection member, and a first networked device connector identifier that identifies a first networked device connector on the first networked device to which the networked connection member has been connected;
   use the network connection member identifier and the first networked device connector identifier to determine that the network connection member should be connected to a second networked device first connector of a plurality of second networked device connectors on a second networked device, wherein the plurality of second networked device connectors are the same type of network device connectors and each of the plurality of second networked device connectors are associated with a second networked device connector indicator; and
   send, subsequent to the receiving the network connection member identifier from the first networked device, an instruction that includes a second networked device connector identifier that identifies the second networked device first connector to the second networked device, wherein the instruction provides for the activation of the second networked device connector indicator associated with the second networked device first connector prior to connection of the network connection member to the second networked device first connector based on:

the second networked device retrieving the network connection member identifier from the network connection member via a communication between a wireless reader in the second networked device and a wireless transmitter in the network connection member; and the network connection member identifier being both retrieved from the network connection member by the second networked device and included in the instruction received by the second networked device from the connection engine.

7. The IHS of claim 6, wherein the connection engine is configured to:
receive, from the first networked device, a first networked device identifier; and
use the network connection member identifier, the first networked device connector identifier, and the first networked device identifier to determine that the network connection member should be connected to the second networked device first connector.

8. The IHS of claim 6, wherein the memory system stores connectivity data describing connections between a plurality of networked devices that include the first networked device and the second networked device, and wherein the connection engine is configured to:
determine that the network connection member should be connected to the second networked device first connector by comparing the network connection member identifier and the first networked device connector identifier to the connectivity data.

9. The IHS of claim 6, wherein the connection engine is configured to:
send the network connection member identifier to the second networked device along with the instruction.

10. The IHS of claim 6, wherein the connection engine is configured to:
determine that the network connection member has been connected to the second networked device first connector and, in response, store a connection mapping for the first networked device and the second networked device in the memory system.

11. The IHS of claim 10, wherein the connection engine is configured to:
determine that the network connection member has been disconnected from the first networked device and the second networked device and, in response, remove the connection mapping for the first networked device and the second networked device from the memory system.

12. A method for connecting networked device, comprising:
receiving, by a network management system from a first networked device, a network connection member identifier that is unique to a network connection member, and a first networked device connector identifier that identifies a first networked device connector on the first networked device to which the networked connection member has been connected;
using, by the network management system, the network connection member identifier and the first networked device connector identifier to determine that the network connection member should be connected to a second networked device first connector of a plurality of second networked device connectors on a second networked device, wherein the plurality of second networked device connectors are the same type of network device connectors and each of the plurality of second networked device connectors are associated with a second networked device connector indicator; and sending, by the network management system to the second networked device subsequent to receiving the network connection member identifier that is unique to the network connection member from the first networked device, a second networked device connector identifier that identifies the second networked device first connector and an instruction that is configured to activate the second networked device connector indicator associated with the second networked device first connector prior to connection of the network connection member to the second networked device first connector based on:
the second networked device retrieving the network connection member identifier from the network connection member via a communication between a wireless reader in the second networked device and a wireless transmitter in the network connection member; and
the network connection member identifier being both retrieved from the network connection member by the second networked device and included in the instruction received by the second networked device from the network management system.

13. The method of claim 12, further comprising:
receiving, by the network management system from the first networked device, a first networked device identifier; and
using, by the network management system, the network connection member identifier, the first networked device connector identifier, and the first networked device identifier to determine that the network connection member should be connected to the second networked device first connector.

14. The method of claim 12, further comprising:
retrieving, by the first networked device, the network connection member identifier from the network connection member via communication between a wireless reader in the first networked device and a second wireless transmitter in the network connection member.

15. The method of claim 12, further comprising:
determining, by the network management system, that the network connection member should be connected to the second networked device first connector by comparing the network connection member identifier and the first networked device connector identifier to connectivity data that is stored in the network management system and that describes connections between a plurality of networked devices that include the first networked device and the second networked device.

16. The method of claim 12, further comprising:
sending, by the network management system to the second networked device, the network connection member identifier along with the instruction.

17. The method of claim 16, further comprising:
storing, by the second networked device, a connection association of the network connection member identifier and the second networked device connector identifier.

* * * * *